US012704392B2

(12) United States Patent
Maust et al.

(10) Patent No.: US 12,704,392 B2
(45) Date of Patent: Aug. 11, 2026

(54) ELECTRIC SEAT MOTOR ABSOLUTE SENSOR DIAGNOSTICS

(71) Applicant: Steering Solutions IP Holding Corporation, Saginaw, MI (US)

(72) Inventors: Brian G. Maust, Unionville, MI (US); Christopher R. Douglas, Saginaw, MI (US); Stan Schlatter, Linwood, MI (US); Andrew E. Maschke, Birch Run, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 72 days.

(21) Appl. No.: 18/781,219

(22) Filed: Jul. 23, 2024

(65) Prior Publication Data

US 2024/0375550 A1 Nov. 14, 2024

Related U.S. Application Data

(62) Division of application No. 17/511,943, filed on Oct. 27, 2021, now Pat. No. 12,071,045.

(60) Provisional application No. 63/106,597, filed on Oct. 28, 2020.

(51) Int. Cl.

| | |
|---|---|
| ***G01D 18/00*** | (2006.01) |
| ***B60N 2/02*** | (2006.01) |
| ***G07C 5/08*** | (2006.01) |

(52) U.S. Cl.
CPC ......... *G01D 18/00* (2013.01); *B60N 2/02246* (2023.08); *B60N 2/0244* (2013.01); *G07C 5/0808* (2013.01); *B60N 2/0268* (2023.08)

(58) Field of Classification Search
None
See application file for complete search history.

(56) References Cited

U.S. PATENT DOCUMENTS

| | | | | |
|---|---|---|---|---|
| 2013/0261896 | A1* | 10/2013 | Gebregergis | B62D 5/046 701/42 |
| 2017/0088016 | A1* | 3/2017 | Frye | B60N 2/0244 |
| 2020/0361522 | A1* | 11/2020 | Weimin | B62D 5/0454 |
| 2023/0331294 | A1* | 10/2023 | Park | B62D 5/30 |
| 2024/0181937 | A1* | 6/2024 | Yang | G01R 23/18 |

* cited by examiner

*Primary Examiner* — James M Mcpherson
(74) *Attorney, Agent, or Firm* — Dickinson Wright PLLC

(57) ABSTRACT

A method for sensor diagnostics in a seat suspension system includes: generating, by a first rotational position sensor, a motor position signal representing a rotational position of a motor shaft, the motor shaft being coupled to an output shaft, such that rotation of the motor shaft causes rotation of the output shaft; generating, by a second rotational position sensor, an output signal representing a rotational position of the output shaft coupled to a suspension mechanism to move a vehicle seat relative to a vehicle body; determining a diagnostic indicator value as a function of the motor position signal and the output signal; and determining, based on the diagnostic indicator value, an accuracy of the output signal to represent the rotational position of the output shaft.

17 Claims, 7 Drawing Sheets

ELECTRIC SEAT MOTOR ABSOLUTE SENSOR DIAGNOSTICS

CROSS-REFERENCES TO RELATED APPLICATIONS

This application is a divisional application of, and claims the benefits of priority to, U.S. application Ser. No. 17/511,943 filed Oct. 27, 2021, and claims priority to U.S. Provisional Patent Application Ser. No. 63/106,597, filed Oct. 28, 2020, the disclosures of which are incorporated by reference herein in their entirety.

TECHNICAL FIELD

This disclosure relates to rotational position sensors, and in particular to sine/cosine rotational position sensors and diagnosis of the integrity of sine/cosine rotational position sensors.

BACKGROUND

A vehicle, such as a car, truck, sport utility vehicle, crossover, mini-van, marine craft, aircraft, all-terrain vehicle, recreational vehicle, or other suitable vehicle, typically includes one or more electric motors to actuate various apparatuses. A gearbox may be used to couple an electric motor to other components of an actuated apparatus. For example, an electric motor and a gearbox may be used to control actuation of an active seat suspension in the vehicle.

Rotational position of the electric motor or an output shaft of the gearbox may be used as a factor for controlling the actuation of the apparatus. One such rotational position sensor is a sine/cosine rotational position sensor. Such a sine/cosine rotational position sensor outputs values corresponding with the sine and the cosine of the rotational angle of a shaft. By comparing the sine and the cosine values, the rotational position can be determined.

One important consideration for systems that employ sensors, such as rotational position sensors, is health of the sensors. The health of a sensor may be an indicator of accuracy and/or reliability of the sensor. By detecting an unhealthy or a faulty sensor, a system can take a responsive action, such as producing a warning or other signal indicating that the sensor is faulty, operating the system or apparatus in a mode that does not use the sensor, and/or using a backup sensor.

SUMMARY

This disclosure relates generally to measuring sensor health of a rotational position sensor.

An aspect of the disclosed embodiments includes a method for sensor diagnostics in a seat suspension system. The method includes: generating, by a first rotational position sensor, a motor position signal representing a rotational position of a motor shaft, the motor shaft being coupled to an output shaft, such that rotation of the motor shaft causes rotation of the output shaft; generating, by a first rotational position sensor, a motor position signal representing a rotational position of a motor shaft; generating, by a second rotational position sensor, an output signal representing a rotational position of the output shaft coupled to a suspension mechanism to move a vehicle seat relative to a vehicle body; determining a diagnostic indicator value as a function of the motor position signal and the output signal; and determining, based on the diagnostic indicator value, an accuracy of the output signal to represent the rotational position of the output shaft. The motor shaft is coupled to the output shaft such that rotation of the motor shaft causes rotation of the output shaft.

An aspect of the disclosed embodiments includes a seat suspension system. The seat suspension system includes: a suspension mechanism coupling a vehicle seat to a vehicle body; an output shaft coupled to the suspension mechanism to move the vehicle seat relative to the vehicle body; a motor shaft coupled to a gear box and to drive the output shaft; a first rotational position sensor configured to measure a rotational position of the motor shaft and to generate a motor position signal representing the rotational position of a motor shaft; a second rotational position sensor configured to measure a rotational position of the output shaft and to generate an output signal representing the rotational position of the output shaft; and a controller. The controller is configured to: determine a diagnostic indicator value as a function of the motor position signal and the output signal; and determine, based on the diagnostic indicator value, an accuracy of the output signal to represent the rotational position of the output shaft.

An aspect of the disclosed embodiments includes a controller for a seat suspension system. The controller includes a processor, and a memory including instructions. The instructions, when executed by the processor, cause the processor to: receive, from a first rotational position sensor, a motor position signal representing a rotational position of a motor shaft, the motor shaft being coupled to an output shaft, such that rotation of the motor shaft causes rotation of the output shaft; receive, from a second rotational position sensor, an output signal representing a rotational position of the output shaft coupled to a suspension mechanism to move a vehicle seat relative to a vehicle body; determine a diagnostic indicator value as a function of the motor position signal and the output signal; and determine, based on the diagnostic indicator value, an accuracy of the output signal to represent the rotational position of the output shaft.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
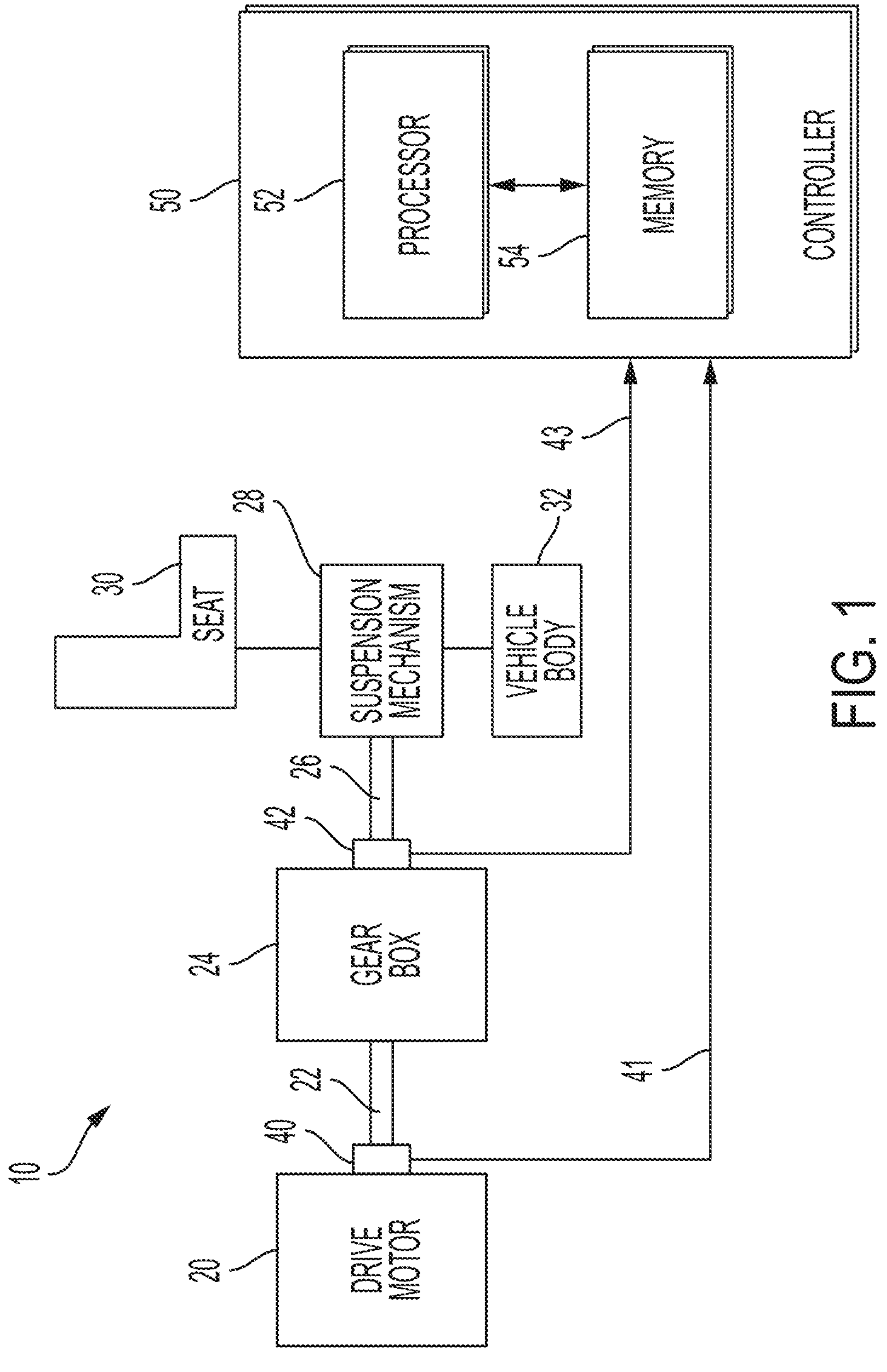
FIG. 1 generally illustrates a block diagram of a seat suspension system according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicle, typically includes one or more electric motors to actuate various apparatuses. A gearbox may be used to couple an electric motor to other components of an actuated apparatus. For example, an electric motor and a gearbox may be used to control actuation of an active seat suspension in the vehicle.

Rotational position of the electric motor or an output shaft of the gearbox may be used as a factor for controlling the actuation of the apparatus. One such rotational position sensor is a sine/cosine rotational position sensor. Such a sine/cosine rotational position sensor outputs values corresponding with the sine and the cosine of the rotational angle of a shaft. By comparing the sine and the cosine values, the rotational position can be determined. One important consideration for systems that employ sensors, such as rotational position sensors, is health of the sensors. The health of a sensor may be an indicator of accuracy and/or reliability of the sensor. By detecting an unhealthy or a faulty sensor, a system can take a responsive action, such as producing a warning or other signal indicating that the sensor is faulty, operating the system or apparatus in a mode that does not use the sensor, and/or using a backup sensor.

In some embodiments, A sine/cosine rotational position sensor may be used to determine a rotational position of an output shaft used to actuate a mechanical apparatus, such as an active seat suspension in the vehicle. Such a sine/cosine rotational position sensor outputs values corresponding with the sine (SIN) and the cosine (COS) of a shaft. By comparing the sine and the cosine sensor output values, a rotational position can be determined.

Methods and systems to measure the health of a sine/cosine rotational position sensor would be advantageous for the operation and maintenance of any system that uses sine/cosine rotational position sensors.

An active seat system may use an electric motor and controller to cancel any floor vibration before it reaches the operators body. Such a system may include a sine/cosine rotational position sensor attached to the Gear Box output shaft. This sine/cosine rotational position sensor will allow for the absolute position of the motor to be determined since the system is mechanically limited to less than 180 degrees of Gear Box output rotation. This disclosure describes algorithms to diagnose the integrity of this sine/cosine rotational position sensor.

The motor being used in the active seat system has a digital position sensor used for motor control. This sensor has very accurate and low noise measurement of motor rotational position, but is limited to one motor revolution of measurement. In order to achieve absolute system position measurement over greater than one motor revolution, a sine/cosine rotational position sensor was added to the output shaft of the gear box. The diagnostics of this sine/cosine rotational position sensor can be broken into 2 parts, Static and Dynamic.

Static Diagnostics: The Static Diagnostics leverage the geometric relationship between sine output and cosine output waveforms. If the sine output signal is plotted versus the cosine output signal, a unity circle is generated. This relationship allows us to generate the following equation: $1=\mathrm{SQRT}(\mathrm{SIN}^2+\mathrm{COS}^2)$. With this relationship defined, we can perform the calculation on the present static signals and we should always have a Unity result of 1. We will add a tolerance around this unity for physical imperfection and we have a measure of sensor health.

Dynamic Diagnostic: The Dynamic Diagnostic consists of continuously comparing the high resolution, low noise, motor sensor to the values generated by the sine/cosine rotational position sensor. The two sensor outputs should be proportional to each other. A tolerance band is added to the comparison for physical build variation. This diagnostic will safe guard against mechanical failures that will allow for a valid, but stuck position value.

FIG. 1 generally illustrates a block diagram of a seat suspension system 10 according to the principles of the present disclosure. The seat suspension system 10 includes a drive motor 20 configured to rotate a motor shaft 22. The motor shaft 22 is coupled to a gear box 24, which drives an output shaft 26. The gear box 24 may drive the output shaft 26 using the rotation of the motor shaft 22 at a fixed or a variable gear ratio. In some embodiments, the gear box 24 may provide a 1:1 coupling between the motor shaft 22 and the output shaft 26. In some embodiments, the gear box 24 provides a speed reduction, or a gear ratio of x:1, where x is a number greater than one. For example, the gear box 24 may be configured to provide a 30:1 gear reduction, causing the output shaft 26 to make one revolution for every 30 revolutions of the motor shaft 22. Such a gear reduction may provide a higher torque, and a more appropriate speed for machinery driven by the output shaft 26. In some embodiments, the output shaft 26 of the seat suspension system 10 is coupled to a suspension mechanism 28 that couples a vehicle seat 30 to a vehicle body 32. Rotation of the output shaft 26 may cause the suspension mechanism 28 to move the vehicle seat 30 relative to the vehicle body 32.

The vehicle seat 30 may be any type of seat for holding one or more persons. For example, the vehicle seat 30 may be a bucket-type seat for holding a single person, such as a driver or a passenger in a vehicle. Alternatively or additionally, the vehicle seat 30 may include a bench-type seat for holding two or more persons. The vehicle body 32 may include any structural component of the vehicle, such as a structural floor, a unibody structure, or a body-on-frame of the vehicle. The suspension mechanism 28 may include various machine components, such as a linear or rotary actuator, and/or one or more linkages, to move the vehicle seat 30 using the rotation of the output shaft 26.

A first rotational position sensor 40 is configured to measure a rotational position of the motor shaft 22. The first rotational position sensor 40 may also be called a motor position sensor. The first rotational position sensor 40 generates a motor position signal 41 representing the rotational position of the motor shaft 22. A digital position sensor may be used for the first rotational position sensor 40. Such a digital position sensor may provide very accurate and low noise measurement of motor rotational position. However, the measurement from such a digital position sensor may be limited to a position within any given revolution of the motor shaft 22.

A second rotational position sensor 42 is configured to measure a rotational position of the output shaft 26. The second rotational position sensor 42 may also be called an output position sensor. The second rotational position sensor 42 generates an output signal 43 representing the rotational position of the output shaft 26. The second rotational position sensor 42 may be a sine/cosine rotational position sensor. Such a sine/cosine rotational position sensor generates a sine output and a cosine output, each corresponding to the associated trigonometric function of a rotational position. By comparing values of the sine output and the cosine output, a rotational position can be determined.

According to an aspect of the disclosure, a very accurate measurement of the rotational position of the output shaft 26 can be determined by considering both the output of the first rotational position sensor 40 and the output of the second rotational position sensor 42. According to another aspect of the disclosure, a precise measurement of the rotational position of the motor shaft 22 over more than one rotation of the of the motor shaft 22 can be determined by considering the output of the second rotational position sensor 42 in addition to the output of the first rotational position sensor 40.

In some embodiments, the seat suspension system 10 may include one or more controllers or electronic control units. As is generally illustrated in FIG. 1, a controller 50 may include any suitable controller. The controller 50 may be configured to control, for example, various aspects of seat suspension system 10, such as aspect of an seat suspension system 10 and/or other suitable features or components of the vehicle. The controller 50 may include a processor 52 and a memory 54.

The processor 52 may include any suitable processor, such as those described herein. Additionally, or alternatively, the controller 50 may include any suitable number of processors, in addition to or other than the processor 52. The memory 54 may comprise a single disk or a plurality of disks (e.g., hard drives), and includes a storage management module that manages one or more partitions within the memory 54. In some embodiments, memory 54 may include flash memory, semiconductor (solid state) memory or the like. The memory 54 may include Random Access Memory (RAM), a Read-Only Memory (ROM), or a combination thereof. The memory 54 may include instructions that, when executed by the processor 52, cause the processor 52 to, at least, control various functions of the seat suspension system 10.

In some embodiments, and as generally illustrated in FIG. 1, the controller 50 is in communication with the first rotational position sensor 40 and the second rotational position sensor 42 for receiving signals from each of the rotational position sensors 40, 42. The controller 50 may be configured to perform one or more control actions, such as controlling operation of the drive motor 20 based on the signals received from one or both of the rotational position sensors 40, 42. In some embodiments, the controller 50 may be configured to determine a health of one or both of the of the rotational position sensors 40, 42.

Figure 2:
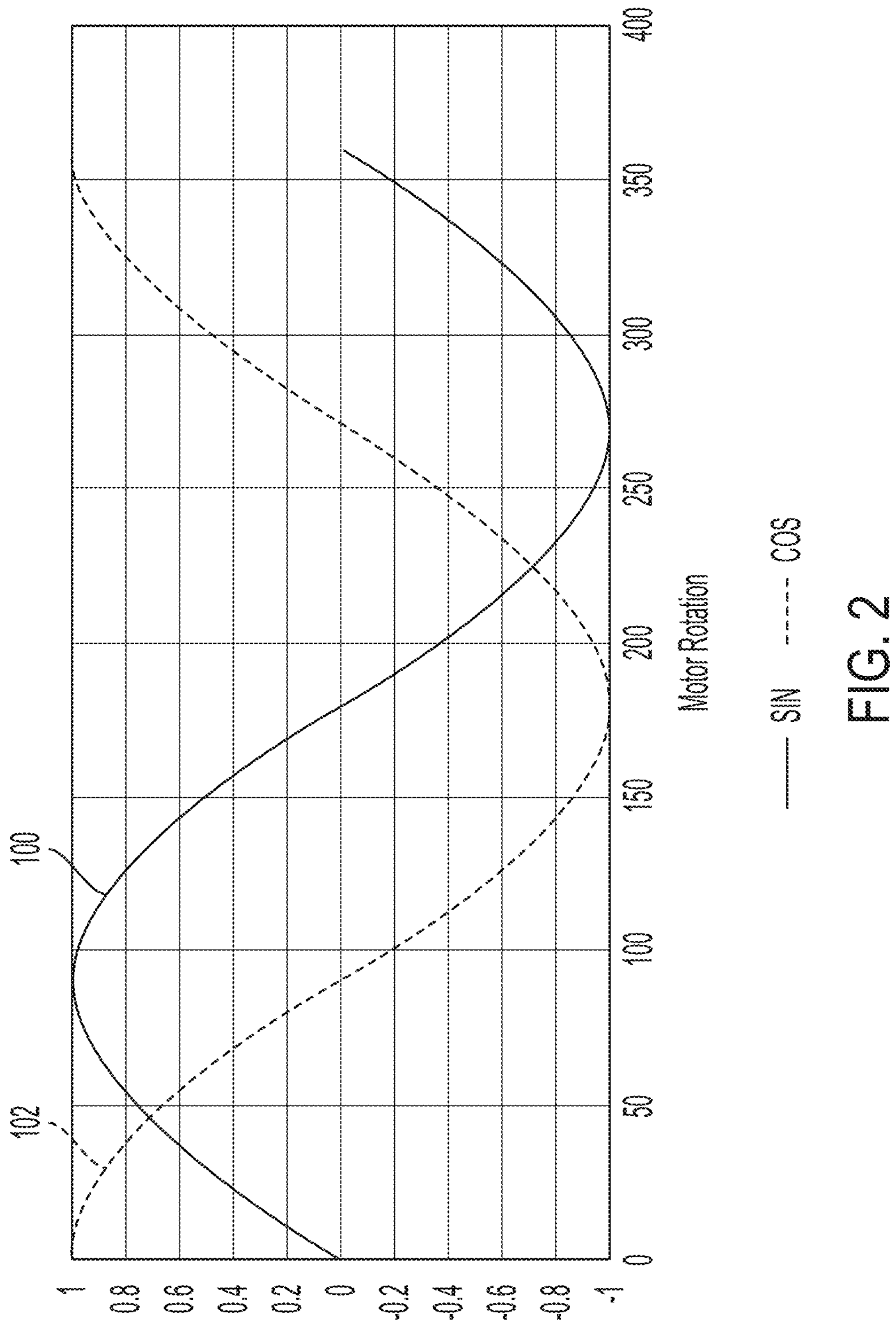
FIG. 2 generally illustrates a graph generally illustrating Sin and Cos outputs of a sine/cosine rotational position sensor according to the principles of the present disclosure.

FIG. 2 shows a graph generally illustrating sine and cosine outputs of a sine/cosine rotational position sensor according to the principles of the present disclosure. Specifically, FIG. 2 includes a first plot 100 of a sine output of the sine/cosine rotational position sensor, and a second plot 102 of a cosine output of the sine/cosine rotational position sensor, each as a function of rotational position, from 0 to 360 degrees. The rotational position of the sine/cosine rotational position sensor can be determined by comparing the relative values of each of the sine output and the cosine output.

Figure 3:
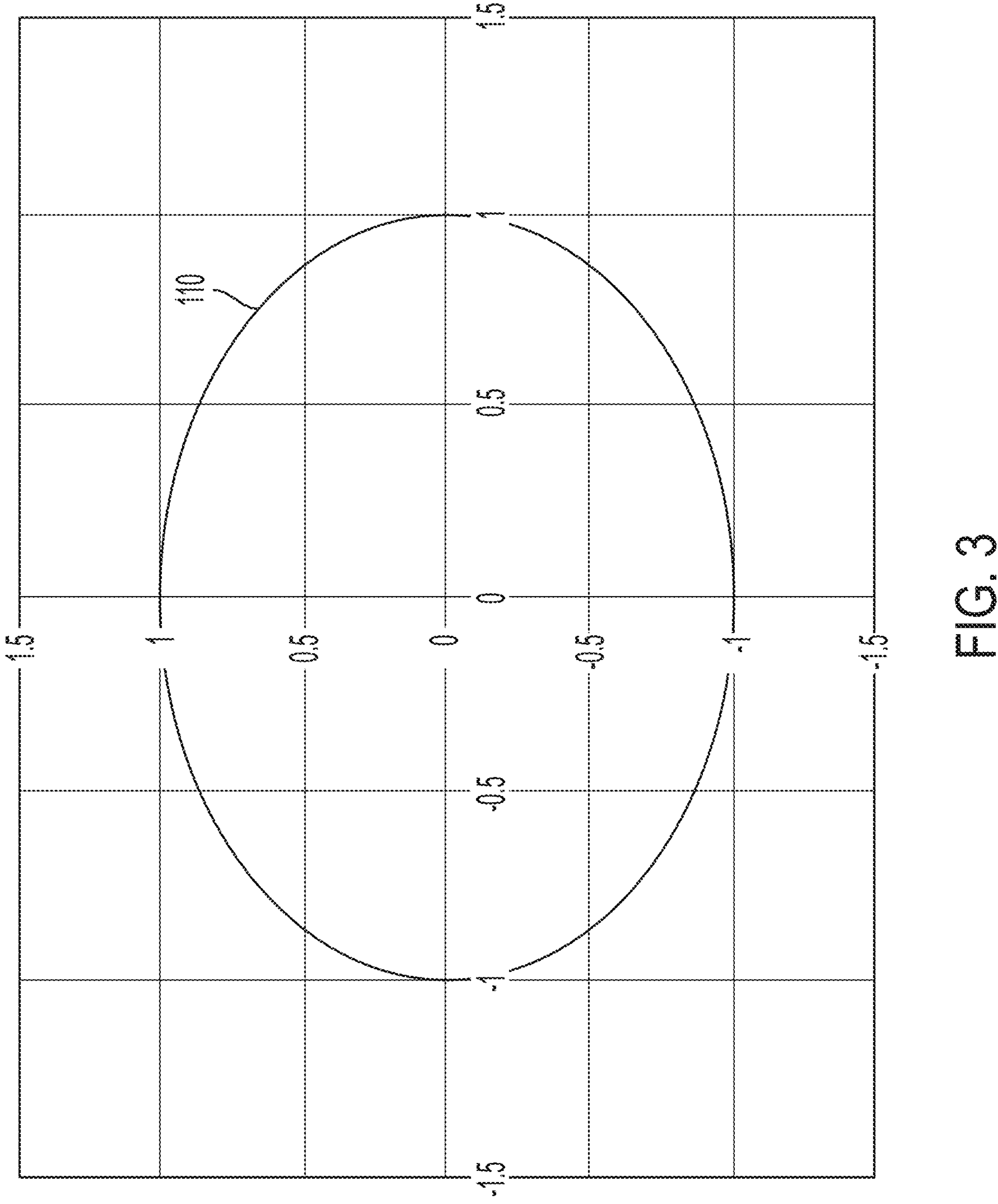
FIG. 3 generally illustrates a graph generally illustrating a unity circle based upon Sin and Cos outputs of a sine/cosine rotational position sensor according to the principles of the present disclosure.

FIG. 3 shows a graph generally illustrating a unity circle based upon sine and cosine outputs of a sine/cosine rotational position sensor according to the principles of the present disclosure. This unity circle follows from the equation $1=\mathrm{SQRT}(\mathrm{SIN}^2+\mathrm{COS}^2)$, where SQRT is a square root function, SIN is the sine output, and COS is the cosine output. In other words, 1 equals the square root of: the sine output squared plus the cosine output squared. With this relationship defined, a calculation can be performed on the sine output and the cosine output of the of the sine/cosine rotational position sensor. A healthy sine/cosine rotational position sensor should always produce sine output and cosine output values that follow the equation $1=\mathrm{SQRT}(\mathrm{SIN}^2+\mathrm{COS}^2)$. Likewise, values for $\mathrm{SQRT}(\mathrm{SIN}^2+\mathrm{COS}^2)$ that are greater than or less than 1.0 may indicate an unhealthy or faulted sine/cosine rotational position sensor. This value of 1.0 may also be called a “unity result.”

A diagnostic that indicates a rotational position sensor which is “healthy” may indicate that the output signal or signals of that rotational position are valid and/or that the output signal or signals produced are indicative of a correct rotational position value that accurately represents the rotational position being sensed.

By computing a diagnostic indicator value based upon the sine output and the cosine output, a faulty or unhealthy sine/cosine rotational position sensor can be diagnosed. For example, the diagnostic indicator value can be calculated as $\mathrm{SQRT}(\mathrm{SIN}^2+\mathrm{COS}^2)$. A tolerance can be provided above and below a nominal value of the diagnostic indicator value to accommodate for physical imperfections, such as a variance in the gain in producing and/or sensing either or both of the sine output and/or the cosine output of the of the sine/cosine rotational position sensor.

Specifically, FIG. 3 includes a plot 110 showing values of the sine output on an x-axis plotted against values of the cosine output on the y-axis. It should be noted that plot 110 is shaped as a circle having a radius of 1.0. The radius of plot 110 represents the nominal value of the diagnostic indicator, which corresponds to the sine/cosine rotational position sensor being healthy. Plot 110 represents outputs of a sine/cosine rotational position sensor in an ideal condition, which may also be called a fully-healthy condition.

Figure 4:
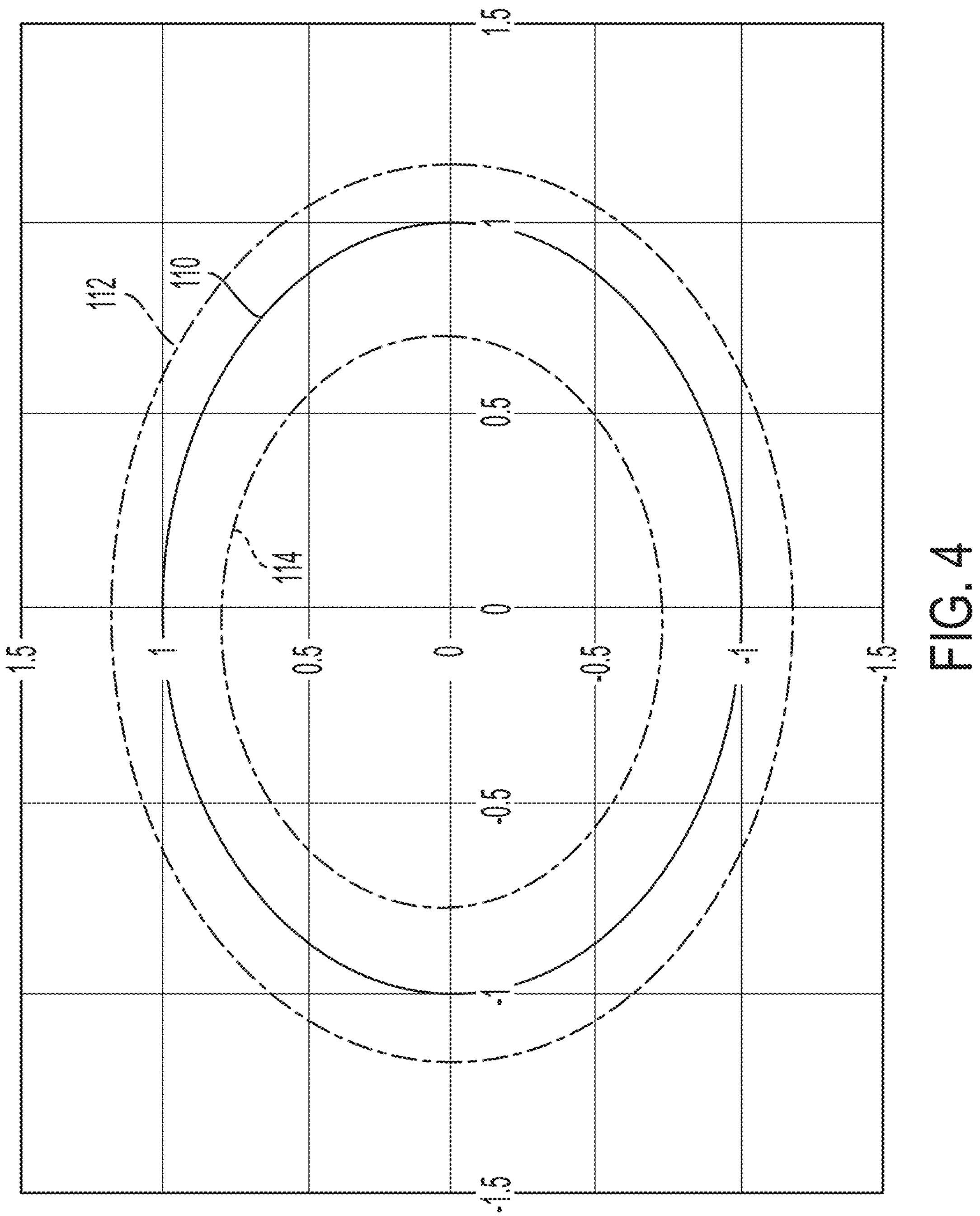
FIG. 4 generally illustrates a graph generally illustrating a unity circle based upon Sin and Cos outputs of a sine/cosine rotational position sensor with outer and inner tolerance circles according to the principles of the present disclosure.

FIG. 4 shows a graph generally illustrating a unity circle based upon SIN and COS outputs of a sine/cosine rotational position sensor with outer and inner tolerance circles according to the principles of the present disclosure. FIG. 4 includes plot 110 of FIG. 3, showing values of the sine output on an x-axis plotted against values of the cosine output on the y-axis. FIG. 4 also includes an outer tolerance circle 112 which is centered around the origin with radius of 1.2. The radius of the outer tolerance circle 112 represents an upper tolerance value. In some embodiments, the upper tolerance value is 1.2. It should be understood that the upper tolerance value may have any value that is larger than the nominal value of the diagnostic indicator. FIG. 4 also includes an inner tolerance circle 114 which is centered around the origin with radius of about 0.75. The radius of the inner tolerance circle 114 represents a lower tolerance value. In some embodiments, the lower tolerance value is 0.75. However, it should be understood that the lower tolerance value may have any value that is less than the nominal value of the diagnostic indicator.

The value of the diagnostic indicator may be used to make a determination regarding the health of the sine/cosine rotational position sensor. More specifically, the health of the sine/cosine rotational position sensor can be diagnosed by comparing the value of the diagnostic indicator against the upper and lower tolerance values. This comparison can be visualized with reference to the graph of FIG. 4 as a comparison between the actual measured values of the sine output and the cosine output of the sine/cosine rotational position sensor to the tolerance circles 112, 114. For example, a calculated value for $SQRT(SIN^2+COS^2)$ may be compared against the lower and upper tolerance values of 0.75 and 1.2, respectively, where SQRT is a square root function, SIN is the sine output and COS is the cosine output. A calculated value that is greater than 1.2 or less than 0.75 may indicate an unhealthy or faulted condition of the sine/cosine rotational position sensor. This diagnostic may be referred to as a "donut diagnostic" due to its ring-shaped valid range.

The calculated value for $SQRT(SIN^2+COS^2)$ may be called a "health indicator value", which is approximately equal to a predetermined constant with the rotational position sensor in a healthy condition. The predetermined constant may be 1.0. Thus, a health indicator value of approximately 1.0 may indicate the sine/cosine rotational position sensor having a healthy condition. Likewise, a health indicator value which is less than the inner tolerance value or which is greater than the outer tolerance value may indicate an unhealthy or faulty sine/cosine rotational position sensor.

Figure 5:
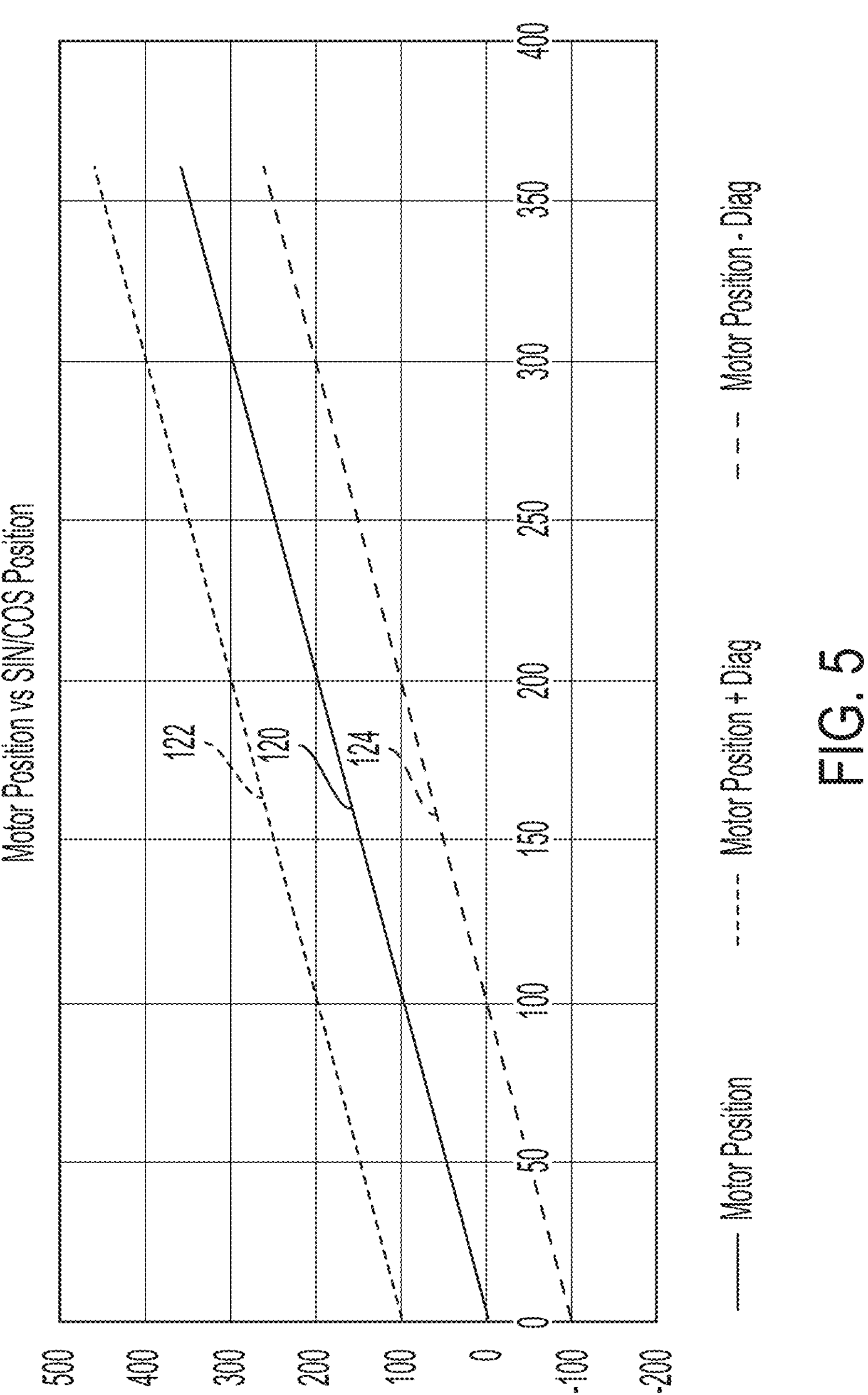
FIG. 5 generally illustrates a graph with a plot of the output of a motor position sensor vs. the output of a sine/cosine rotational position sensor, with plots of upper and lower tolerance values according to the principles of the present disclosure.

FIG. 5 shows a graph with a plot of the output of a motor position sensor vs. the output of a sine/cosine rotational position sensor, with plots of upper and lower tolerance values according to the principles of the present disclosure. Specifically, FIG. 5 includes a plot 120 showing a measured rotational position of the motor shaft 22 plotted against a measured rotational position of the output shaft 26. The measured rotational position of the motor shaft 22 may be determined by the first rotational position sensor 40, and the measured rotational position of the output shaft 26 may be determined by the second rotational position sensor 42. In cases where the output shaft 26 is rotated with the motor shaft 22 via the gear box 24 at a fixed gear ratio, the outputs of the two rotational position sensors 40, 42 should be proportional to each other. In other words, the plot 120 should be continuous with a constant slope.

A health indicator value may be calculated as a function a sensor output representing a rotational position of an output shaft and as a function of a sensor output representing a rotational position of the motor shaft. More specifically, the health indicator may be calculated as a ratio of the sensor output of the rotational position sensor representing a rotational position of an output shaft to a sensor output of a motor position sensor representing a rotational position of a motor shaft.

In some embodiments, a tolerance band may be added to accommodate variation in physical build, such as a nonlinear gain in producing and/or sensing the output of either or both of the two rotational position sensors 40, 42. The tolerance band may be represented by an upper bound 122 and a lower bound 124 shown in the graph of FIG. 5. A ratio of the outputs of the two rotational position sensors 40, 42 that is outside of the bounds 122, 124, may represent a faulted condition.

This diagnostic may be used as a safeguard against mechanical failures that could allow for a valid, but stuck position value from the sine/cosine rotational position sensor. For example, the rotational position sensor 42 may become decoupled from the output shaft 26, which may result in the second rotational position sensor 42 reporting valid sine output and cosine output values, but which incorrectly identify the actual rotational position of the output shaft. Such a failure may be detected by this diagnostic, which depends on an expected rotational position of the output shaft as a function of the rotational position of the motor shaft 22.

Figure 6:
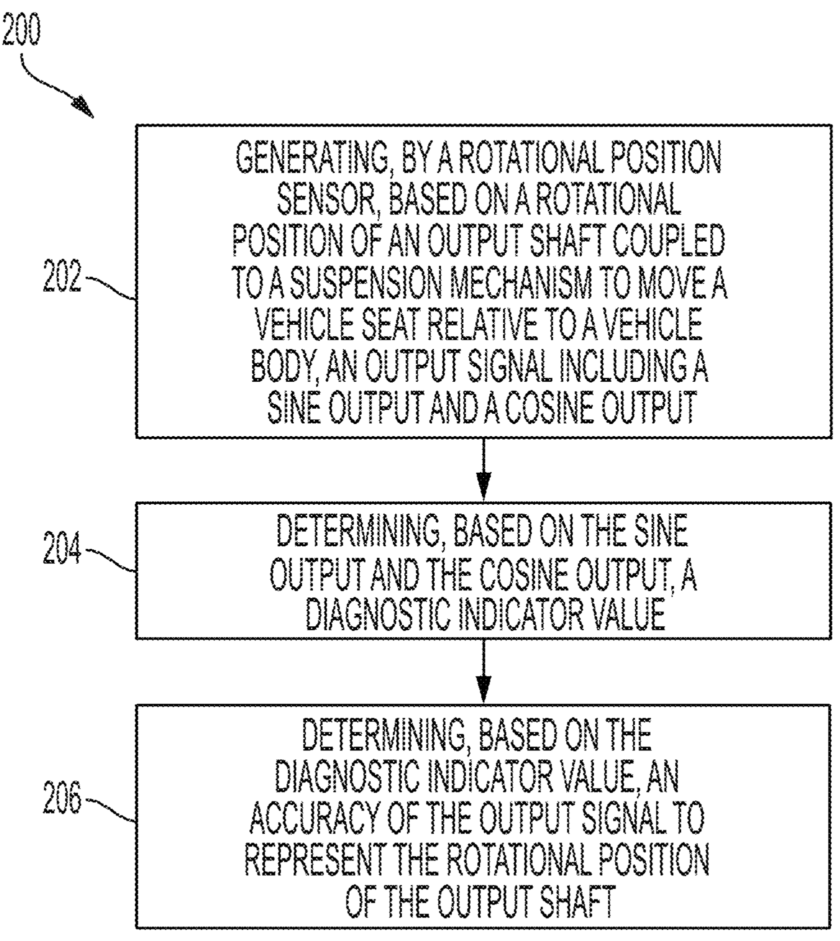
FIG. 6 is a flow diagram generally illustrating a sensor diagnostic method according to the principles of the present disclosure.

FIG. 6 is a flow diagram generally illustrating a first method 200 for sensor diagnostics in a seat suspension system, according to the principles of the present disclosure. The first method 200 may be called a static sensor diagnostic method. The controller 50 may be configured to perform one or more steps of the first method 200. For example, the memory 54 may store instructions that, when executed by the processor 52, cause the processor 52 to implement the corresponding steps of the first method 200.

At 202, the first method 200 generates, by a rotational position sensor, an output signal including a sine output and a cosine output. The output signal is based on a rotational position of an output shaft coupled to a suspension mechanism to move a vehicle seat relative to a vehicle body. The rotational position sensor used in step 202 may be the second rotational position sensor 42. The sine output and the cosine output may each be components of the output signal 43.

At 204, the first method 200 determines a diagnostic indicator value based on the sine output and the cosine output of the rotational position sensor. In some embodiments, the controller 50 may perform step 204.

At 206, the first method 200 determines an accuracy of the output signal to represent the rotational position of the output shaft, based on the diagnostic indicator value. In some embodiments, the controller 50 may perform step 206. For example, the controller 50 may determine an accuracy of the output signal 43 based on a difference between the diagnostic indicator value and a nominal value. Alternatively or additionally, the controller 50 may determine an accuracy of the output signal 43 by comparing the diagnostic indicator value to one or more tolerance values, such as an upper tolerance value and/or a lower tolerance value.

Figure 7:
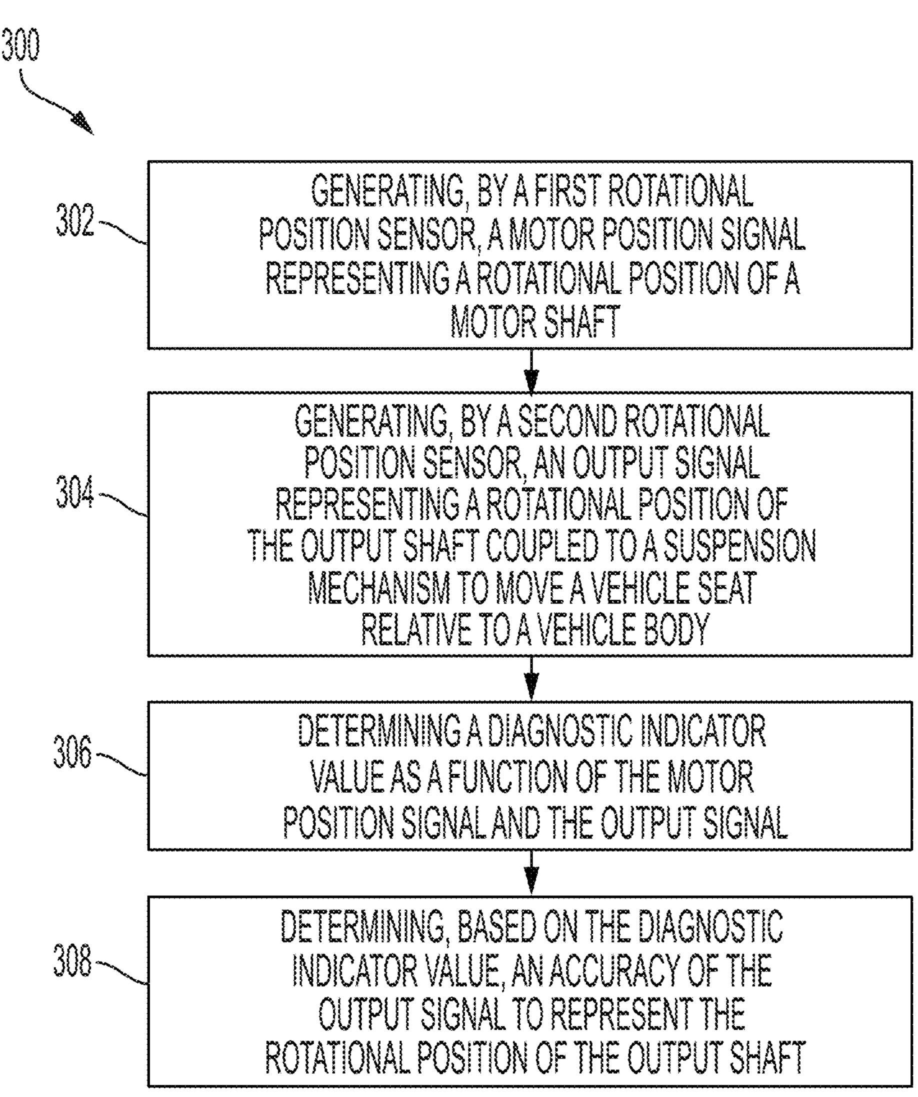
FIG. 7 is a flow diagram generally illustrating a sensor diagnostic method according to the principles of the present disclosure.

FIG. 7 is a flow diagram generally illustrating a second method 300 for sensor diagnostics in a seat suspension system, according to the principles of the present disclosure. The second method 300 may be called a dynamic sensor diagnostic method. The controller 50 may be configured to perform one or more steps of the second method 300. For example, the memory 54 may store instructions that, when executed by the processor 52, cause the processor 52 to implement the corresponding steps of the second method 300.

At 302, the second method 300 generates, by a first rotational position sensor, a motor position signal representing a rotational position of a motor shaft. The motor shaft may be coupled to an output shaft such that rotation of the motor shaft causes rotation of the output shaft. For example, the motor shaft 22 may be coupled to the output shaft 26 through the gear box 24. Alternatively or additionally, the motor shaft 22 may be directly coupled to the output shaft 26 and/or coupled together using one or more other devices, such as a clutch, a flex coupling, a viscous fluid coupling, etc.

At 304, the second method 300 generates, by a second rotational position sensor, an output signal representing a rotational position of the output shaft coupled to a suspension mechanism to move a vehicle seat relative to a vehicle body.

At 306, the second method 300 determines a diagnostic indicator value as a function of the motor position signal and the output signal. In some embodiments, the controller 50 may perform step 306 by calculating or otherwise determining the diagnostic indicator value as a function of each of the motor position signal and the output signal.

At 308, the second method 300 determines, based on the diagnostic indicator value, an accuracy of the output signal to represent the rotational position of the output shaft. In some embodiments, the controller 50 may perform step 306 by calculating or otherwise determining the accuracy of the output signal to represent the rotational position of the output shaft based on the diagnostic indicator value.

According to an aspect of the disclosure, a method for sensor diagnostics in a seat suspension system is provided. The method includes: generating, by a first rotational position sensor, a motor position signal representing a rotational position of a motor shaft, the motor shaft being coupled to an output shaft, such that rotation of the motor shaft causes rotation of the output shaft; generating, by a second rotational position sensor, an output signal representing a rotational position of the output shaft coupled to a suspension mechanism to move a vehicle seat relative to a vehicle body; determining a diagnostic indicator value as a function of the motor position signal and the output signal; and determining, based on the diagnostic indicator value, an accuracy of the output signal to represent the rotational position of the output shaft.

In some embodiments, the motor shaft is coupled to the output shaft such that rotation of the motor shaft causes rotation of the output shaft.

In some embodiments, the output signal may include a sine output and a cosine output, each of the sine output and the cosine output representing the rotational position of the output shaft.

In some embodiments, determining, based on the diagnostic indicator value, the accuracy of the output signal to represent the rotational position of the output shaft may further comprise comparing the diagnostic indicator value to a tolerance value.

In some embodiments, the tolerance value may include an upper tolerance value; and comparing the diagnostic indicator value to the tolerance value may include determining if the diagnostic indicator value is greater than the upper tolerance value.

In some embodiments, the tolerance value may include a lower tolerance value; and comparing the diagnostic indicator value to the tolerance value may include determining if the diagnostic indicator value is less than the lower tolerance value.

In some embodiments, determining the diagnostic indicator value includes calculating a ratio of the output signal to the motor position signal.

An aspect of the disclosed embodiments includes a seat suspension system. The seat suspension system includes: a suspension mechanism coupling a vehicle seat to a vehicle body; an output shaft coupled to the suspension mechanism to move the vehicle seat relative to the vehicle body; a motor shaft coupled to a gear box and to drive the output shaft; a first rotational position sensor configured to measure a rotational position of the motor shaft and to generate a motor position signal representing the rotational position of a motor shaft; a second rotational position sensor configured to measure a rotational position of the output shaft and to generate an output signal representing the rotational position of the output shaft; and a controller. The controller is configured to: determine a diagnostic indicator value as a function of the motor position signal and the output signal; and determine, based on the diagnostic indicator value, an accuracy of the output signal to represent the rotational position of the output shaft.

In some embodiments, the output signal includes a sine output and a cosine output, each of the sine output and the cosine output representing the rotational position of the output shaft.

In some embodiments, determining the accuracy of the output signal to represent the rotational position of the output shaft further comprises the controller being configured to compare the diagnostic indicator value to a tolerance value.

In some embodiments, the tolerance value includes an upper tolerance value; and comparing the diagnostic indicator value to the tolerance value includes the controller being configured to determine if the diagnostic indicator value is greater than the upper tolerance value.

In some embodiments, the tolerance value includes a lower tolerance value; and comparing the diagnostic indicator value to the tolerance value includes the controller being configured to determine if the diagnostic indicator value is less than the lower tolerance value.

In some embodiments, determining the diagnostic indicator value includes calculating a ratio of the output signal to the motor position signal.

An aspect of the disclosed embodiments includes a controller for a seat suspension system. The controller includes a processor, and a memory including instructions. The instructions, when executed by the processor, cause the processor to: receive, from a first rotational position sensor, a motor position signal representing a rotational position of a motor shaft, the motor shaft being coupled to an output shaft, such that rotation of the motor shaft causes rotation of the output shaft; receive, from a second rotational position sensor, an output signal representing a rotational position of the output shaft coupled to a suspension mechanism to move a vehicle seat relative to a vehicle body; determine a diagnostic indicator value as a function of the motor position signal and the output signal; and determine, based on the diagnostic indicator value, an accuracy of the output signal to represent the rotational position of the output shaft.

In some embodiments, the output signal includes a sine output and a cosine output, each of the sine output and the cosine output representing the rotational position of the output shaft.

In some embodiments, determining the accuracy of the output signal to represent the rotational position of the output shaft further comprises the controller being configured to compare the diagnostic indicator value to a tolerance value.

In some embodiments, the tolerance value includes an upper tolerance value; and comparing the diagnostic indicator value to the tolerance value includes the controller being configured to determine if the diagnostic indicator value is greater than the upper tolerance value.

In some embodiments, the tolerance value includes a lower tolerance value; and comparing the diagnostic indicator value to the tolerance value includes the controller being configured to determine if the diagnostic indicator value is less than the lower tolerance value.

In some embodiments, determining the diagnostic indicator value includes calculating a ratio of the output signal to the motor position signal.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for sensor diagnostics in a seat suspension system, comprising:

generating, by a first rotational position sensor, a motor position signal representing a rotational position of a motor shaft, the motor shaft being coupled to an output shaft, such that rotation of the motor shaft causes rotation of the output shaft;

generating, by a second rotational position sensor, an output signal representing a rotational position of the output shaft coupled to a suspension mechanism to move a vehicle seat relative to a vehicle body, wherein the output signal includes a sine output and a cosine output, each of the sine output and the cosine output representing the rotational position of the output shaft;

determining a diagnostic indicator value as a function of the motor position signal and the output signal; and determining, based on the diagnostic indicator value, an accuracy of the output signal to represent the rotational position of the output shaft.

2. The method of claim 1, wherein determining the accuracy of the output signal to represent the rotational position of the output shaft further comprises comparing the diagnostic indicator value to a tolerance value.

3. The method of claim 2, wherein the tolerance value includes an upper tolerance value; and comparing the diagnostic indicator value to the tolerance value includes determining if the diagnostic indicator value is greater than the upper tolerance value.

4. The method of claim 2, wherein the tolerance value includes a lower tolerance value; and comparing the diagnostic indicator value to the tolerance value includes determining if the diagnostic indicator value is less than the lower tolerance value.

5. The method of claim 1, wherein determining the diagnostic indicator value includes calculating a ratio of the output signal to the motor position signal.

6. A seat suspension system, comprising:

a suspension mechanism coupling a vehicle seat to a vehicle body;

an output shaft coupled to the suspension mechanism to move the vehicle seat relative to the vehicle body;

a motor shaft coupled to a gear box and to drive the output shaft;

a first rotational position sensor configured to measure a rotational position of the motor shaft and to generate a motor position signal representing the rotational position of a motor shaft;

a second rotational position sensor configured to measure a rotational position of the output shaft and to generate an output signal representing the rotational position of the output shaft; and a controller configured to:

determine a diagnostic indicator value as a function of the motor position signal and the output signal; and determine, based on the diagnostic indicator value, an accuracy of the output signal to represent the rotational position of the output shaft.

7. The seat suspension system of claim 6, wherein the output signal includes a sine output and a cosine output, each of the sine output and the cosine output representing the rotational position of the output shaft.

8. The seat suspension system of claim 6, wherein determining the accuracy of the output signal to represent the rotational position of the output shaft further comprises the controller being configured to compare the diagnostic indicator value to a tolerance value.

9. The seat suspension system of claim 8, wherein the tolerance value includes an upper tolerance value; and comparing the diagnostic indicator value to the tolerance value includes the controller being configured to determine if the diagnostic indicator value is greater than the upper tolerance value.

10. The seat suspension system of claim 8, wherein the tolerance value includes a lower tolerance value; and comparing the diagnostic indicator value to the tolerance value includes the controller being configured to determine if the diagnostic indicator value is less than the lower tolerance value.

11. The seat suspension system of claim 6, wherein determining the diagnostic indicator value includes calculating a ratio of the output signal to the motor position signal.

12. A controller for a seat suspension system comprising:

a processor; and a memory including instructions that, when executed by the processor, cause the processor to:

receive, from a first rotational position sensor, a motor position signal representing a rotational position of a motor shaft, the motor shaft being coupled to an output shaft, such that rotation of the motor shaft causes rotation of the output shaft;

receive, from a second rotational position sensor, an output signal representing a rotational position of the output shaft coupled to a suspension mechanism to move a vehicle seat relative to a vehicle body;

determine a diagnostic indicator value as a function of the motor position signal and the output signal;

determine, based on the diagnostic indicator value, an accuracy of the output signal to represent the rotational position of the output shaft;

determine the diagnostic indicator value indicating an unhealthy or faulted condition; and automatically perform, in response to determining the diagnostic indicator value indicating an unhealthy or faulted condition, a responsive action including at least one of: producing a warning, or operating the seat suspension system in a mode that does not use the second rotational position sensor.

13. The controller of claim 12, wherein the output signal includes a sine output and a cosine output, each of the sine output and the cosine output representing the rotational position of the output shaft.

14. The controller of claim 12, wherein determining the accuracy of the output signal to represent the rotational position of the output shaft further comprises the controller being configured to compare the diagnostic indicator value to a tolerance value.

15. The controller of claim 14, wherein the tolerance value includes an upper tolerance value; and comparing the diagnostic indicator value to the tolerance value includes the controller being configured to determine if the diagnostic indicator value is greater than the upper tolerance value.

16. The controller of claim 14, wherein the tolerance value includes a lower tolerance value; and comparing the diagnostic indicator value to the tolerance value includes the controller being configured to determine if the diagnostic indicator value is less than the lower tolerance value.

17. The controller of claim 12, wherein determining the diagnostic indicator value includes calculating a ratio of the output signal to the motor position signal.

* * * * *